United States Patent [19]
Yokoi et al.

[11] Patent Number: 5,669,274
[45] Date of Patent: Sep. 23, 1997

[54] METHOD FOR FORMING CAM FACE ON STRUCTURE MEMBER OF LOADING CAM DEVICE FOR TOROIDAL-TYPE CONTINUOUSLY VARIABLE TRANSMISSION

[75] Inventors: Kouichi Yokoi, Fujisawa; Takashi Yoshikai, Maebashi; Masami Tanaka, Maebashi; Hideki Hashitani, Maebashi, all of Japan

[73] Assignee: NSK Ltd., Tokyo, Japan

[21] Appl. No.: 515,582

[22] Filed: Aug. 16, 1995

[30] Foreign Application Priority Data

Aug. 26, 1994 [JP] Japan ................................. 6-202265

[51] Int. Cl.⁶ ............................................. B23B 1/00
[52] U.S. Cl. ........................................ 82/1.11; 82/118
[58] Field of Search ............................ 82/1.11, 1.12, 82/117, 118, 123, 134

[56] References Cited

U.S. PATENT DOCUMENTS 4,343,206  8/1982  Douglass et al. .
5,138,894  8/1992  Kraus .
5,177,842  1/1993  Hongo ............................. 82/123

FOREIGN PATENT DOCUMENTS

| 0 389 790 | 10/1990 | European Pat. Off. . |
| 0 534 740 A1 | 3/1993 | European Pat. Off. . |
| 588067 | 1/1978 | U.S.S.R. ............... 82/1.11 |
| 1743703 | 6/1992 | U.S.S.R. ............... 82/1.11 |
| WO 91/11760 | 8/1991 | WIPO . |

*Primary Examiner*—Daniel W. Howell
*Assistant Examiner*—Kenneth J. Hansen
*Attorney, Agent, or Firm*—Sughrue, Mion, Zinn, Macpeak and Seas.

[57] ABSTRACT

To provide a loading cam device which is capable of ensuring a necessary accuracy, improving the efficiency of the formation of a cam face, and reducing the manufacturing cost. A cam plate is fixedly secured to a chuck rotationally driven by a main shaft. A cutter is axially placed on one surface of the cam plate. A holder holding the cutter is axially displaced in synchronism with the rotation of the chuck to make an irregularity conforming with the cross-sectional configuration of the cam face. In addition, a header is displaced in the diametrical directions of the chuck to make an irregularity throughout.

2 Claims, 3 Drawing Sheets

METHOD FOR FORMING CAM FACE ON STRUCTURE MEMBER OF LOADING CAM DEVICE FOR TOROIDAL-TYPE CONTINUOUSLY VARIABLE TRANSMISSION

BACKGROUND OF THE INVENTION

1. Field of the Invention

The present invention relates to a method for forming a cam face on a structure member of a loading cam device for a toroidal-type continuously variable transmission, which is applicable to forming an irregular surface, i.e., a cam face, extending circumferentially, on a back surface of an input-side disk constituting a toroidal-type continuously variable transmission or one surface of a cam plate opposite to the back surface.

2. Description of the Related Art

Studies have been made to use a toroidal-type continuously variable transmission, as illustrated in FIGS. 1 and 2, as a transmission for motor vehicles or a transmission for various industrial machines. In the toroidal-type continuously variable transmission, an input-side disk 2 is supported to be coaxial with an input shaft 1 rotatably supported in the inside a transmission case (not shown) and an output-side disk 4 is fixed at an end portion of an output shaft 3 similarly supported rotatably with respect to the transmission case. On an inner surface of the transmission case housing the toroidal-type continuously variable transmission or on a supporting bracket provided within the transmission case, there are placed trunnions 5, 5 swinging about pivots placed at positions twisted relative to the input shaft 1 and the output shaft 3, respectively.

Each of the trunnions 5, 5 is made of a metallic material having a satisfactory rigidity, and the foregoing pivots are provided with respect to the outside surfaces of both ends thereof. Further, around displacement shafts 6, 6 fitted at central portions of the respective trunnions 5, 5 there are located power rollers 7, 7 rotatably supported. The respective power rollers 7, 7 are interposed between the input-side disk 2 and the output-side disk 4.

On one axial surface of the input-side disk 2 and the output-side disk 4 facing each other, there are formed an input-side concave surface 2a and an output-side concave surface 4a each having an arc configuration about a point on the pivot. Peripheral surfaces 7a, 7a of the power rollers 7, 7 formed on rotational arc-shaped convexs are made to come into contact with the input-side concave surface 2a and the output-side concave surface 4a.

Between the input shaft 1 and the input-side disk 2, there is fitted a loading cam device 8 acting as a rotational-force transfer apparatus with a pressuring function extending axially. The loading cam device 8 allows the input-side disk 2 to be freely pressed toward the output-side disk 4. The loading cam device 8 is made up of a cam plate 9 rotatable together with the input shaft 1 and a plurality of rollers 11, 11 (for example, four) held through retainer 10. On one surface (the right-hand surface in FIGS. 1 and 2) of the cam plate 9, there is formed a cam face 12 which is an irregular surface extending circumferentially, and further on the outside surface (left-hand surface in FIGS. 1 and 2) of the input-side disk 2, there is formed a cam face 13 similar thereto. The plurality of rollers 11, 11 are made to be rotatable radially about the axis of the input shaft 1. The input-side disk 2 is supported to be slightly swingable axially (in the right and left directions in FIGS. 1 and 2) with respect to the input shaft 1 and further to be slightly displaceable in the rotational direction.

As the input shaft 1 rotates, the cam plate 9 also rotates so that a rotational phase difference takes place with respect to the input-side disk 2, whereby the plurality of rollers 11, 11 run on the cam faces 12 and 13 so that the cam plate 9 and the input-side disk 2 are separated from each other. The cam plate 9 is supported by the input shaft 1, supported by a bearing on the transmission case, to be axially movable, for which reason the input-side disk 2 is pressed toward the power rollers 7, 7 which in turn are pressed toward the output-side disk 4. On the other hand, the output-side disk 4 is supported to be rotatable together with the output shaft 3 with respect to the transmission case, but not movable axially. Therefore, the power rollers 7, 7 are pressed between the input-side disk 2 and the output-side disk 4. This pressing creates a pressing force between the circumferential surfaces 7a, 7a of the power rollers 7, 7 and both the input-side cancave surface 2a and the output-side concave surface 4a so that the rotation of the input-side disk 2 can be transferred through the power rollers 7, 7 to the output-side disk 4 without substantially slipping, thereby rotating the output shaft 3 fixedly secured to the output-side disk 4. In a state in which the plurality of power rollers 7, 7 are sufficiently pressed between the input-side disk 2 and the output-side disk 4, the further separation between the cam plate 9 and the input-side disk 2 does not occur. As a result, the plurality of rollers 11, 11 are engaged with a portion between the convexs of both the cam faces 12, 13, with the result that the rotational motion transferred from the input shaft 1 to the cam plate 9 can directly be transmitted to the input-side disk 2.

In cases where the rotating speed ratio (transmission gear ratio) of the input shaft 1 and the output shaft 3 is Changed and the deceleration is first made between the input shaft 1 and the output shaft 3, as shown in FIG. 1 the trunnions 5, 5 are operated to swing about the pivots to incline the displacement shafts 6, 6 so that the circumferential surfaces 7a, 7a of the power rollers 7, 7 come into contact with a portion of the input-side concave surface 2a near its central portion and further contact with a portion of the output-side concave surface 4a near its peripheral portion, respectively. On the contrary, in the case of acceleration, as shown in FIG. 2 the trunnions 5, 5 are made to swing to incline the displacement shafts 6, 6 so that the circumferential surfaces 7a, 7a of the power rollers 7, 7 come into contact with a portion of the input-side concave surface 2a near its peripheral portion and further contact with a portion of the output-side concave surface 4a near its central portion, respectively. When the inclined angles of the displacement shafts 6, 6 are set to a value between the values as shown in FIGS. 1 and 2, an intermediate transmission gear ratio is obtainable between the input shaft 1 and the output shaft 3.

Although the basic structure and operation of the toroidal-type continuously variable transmission is as described above, the cam faces 12, 13 making up the loading cam device 8 to be incorporated into such a toroidal-type continuously variable transmission have configurations exemplified in FIGS. 3 and 4. More specifically, flat portions 14, 14, as indicated by oblique lines in FIG. 3, are circumferentially formed at an equal interval at a plurality places (four places in the figure) on the cam face 12 (13). Further, V-shaped concave surface 15, 15 which are the lowest portions are circumferentially provided between the adjacent flat portions 14, 14. The bottom portions 16, 16 of the respective concave surfaces 15, 15 have arc-shaped surfaces each of which has the radius of curvature R. In addition, steps L are respectively formed between the bottom portions 16, 16 and the flat portions 14, 14. The pitch (central angle) of the circumferentially adjacent bottom portions 16, 16 is set to 90 degrees and the central angles of the flat portions 14, 14 are set to approximately 10 degrees. Accordingly, the central angles of the concave surfaces 15, 15 are approximately 80 degrees.

As means to manufacture a cam face with such a configuration, there have heretofore been adopted either 1) a method of forming the cam face by a rotary tool using a machining center or 2) a method of forming the cam face through a swinging forging. Of these, in the method 1), a workpiece (the cam plate 9 to the input-side disk 2 on which the cam face 12 (13) is turned out) is fixed onto a work supporting base in the machining center and indexed in a given manner, while the peripheral surface of the rotary tool is brought into contact with a surface to be processed (a surface in which the cam face 12 (13) is formed). That is, the configuration as shown in FIGS. 3 and 4 is profiled while the peripheral surface of the rotary tool comes into contact with the surface to be processed. Accordingly, the outer diameter D of the rotary tool is set to be just two times (D=2R) the radius of curvature R, and the peripheral surface of the rotary tool produces the configurations of the bottom portions 16, 16. Further, in general the radius of curvature R is designed to be coincident with a radius of curvature of the peripheral surface of the rollers 11, 11 (FIGS. 1 and 2).

On the other hand, in the case of the method 2), a workpiece is placed on the upper surface of a fixed model so that a surface to be processed is brought into contact therewith, while a cope is pressed against the surface to be processed and simultaneously swung. Thus, when the cope is swung in a state in which the surface to be processed is pressed against the upper surface of the model, the metallic material constituting the workpiece moves to form the concave surfaces 15, 15.

There is a problem which arises with the formation of the cam faces 12, 13 on the one surface of the cam plate 9 or on the back surface of the input-side disk 2 according to the conventional methods, however, in that it is difficult to form the cam surfaces with satisfactory accuracy at a low cost.

First of all, in the case of the aforementioned method 1) using the rotary tool, the accuracy and the cost reduction are incompatible with each other, for the following reason. That is, the radius of curvature R of the bottom portions 16, 16 of the concave surfaces 15, 15 making up the cam face 12 (13) are approximately 8 to 10 [mm] for a general toroidal-type continuously variable transmission to be used as a motor vehicle transmission. Accordingly, the outer diameter D of the rotary tool to be employed is approximately 16 to 20 [mm]. In processing, such a rotary tool is cantilever-supported and rotated while the tip portion or mid-portion thereof is brought into contact with the surface being processed. Accordingly, taking the elastic deformation of the rotary tool into consideration, it is difficult to considerably increase the force by which the peripheral surface of the rotary tool is pressed against the surface being processed.

For the above reason, for the formation of the cam face 12 (13) according to the method 1), the peripheral surface of the rotary tool must be pressed against the surface with at a soft load so as to require a long time for the formation of the cam face 12 (13), which makes it difficult to avoid increasing the manufacturing cost because of poor efficiency. Moreover, since the peripheral surface of the rotary tool that is cantilever-supported is pressed against the surface being processed even if it is by a soft load, elastic deformation of the rotary tool is unavoidable, thereby lowering the configuration accuracy.

On the other hand, in the case of the method 2) due to the swinging forging, pre-processing and post-processing are necessary, increasing the manufacturing cost. That is, for the swinging forging, pre-processing such as turning is made for the surface being processed which is formed by hot forging to have a given shape, the surface layer of the surface being processed is removed, and the surface is made to be flat. In addition, after the swinging processing, the excessive thickness portions diametrically extruding inwardly and outwardly from the outer edges need to be removed by cutting. A part of the material, i.e., portions corresponding to the concave surfaces 15, 15 move in the surface direction, while at this time the diametrical movement of the material becomes larger as compared with the circumferential movement thereof, with the result that the metallic portions squeezed out from the portions corresponding to the concaves 15, 15 extrude as excessive thickness portions from the inner and outer circumferential edges of the workpiece after the swinging forging. Thus, the post-processing is needed in order to remove the excessive thickness portion protruding from the inner and outer circumferential edges. This, together with the foregoing pre-processing, raises the manufacturing cost.

Furthermore, forming the cam face 12 (13) by cold forging is taken into consideration but not still put in practice because of in high equipment cost. More specifically, since the overall dimension of the cam plate 9 and the input-side disk 2 to be incorporated into the toroidal-type continuously variable transmission used as a motor vehicle transmission is over approximately 120 [mm], a large-capacity press apparatus is needed when the cam face 12 (13) is formed on these members 9, 2 by the cold forging.

SUMMARY OF THE INVENTION

The present invention has been developed in consideration of the above situation, and a method of forming a cam face on a structure member of a loading cam device for a toroidal-type continuously variable transmission according to the present invention can form the cam faces 12, 13 with satisfactory accuracy at a low cost.

In a method of forming a cam face on a structure member of a loading cam device for a toroidal-type continuously variable transmission according to the present invention, the structure member built in the loading cam device to be rotatable about its own axis is rotated about the axis, while a cutting tool is brought axially into contact with one axial surface of the structure member on which the cam surface is to be turned and axially displaced in accordance with the rotational angle of the structure member, thereby forming, on the one axial surface thereof, the cam face which is an irregular surface circumferentially extending.

According to the present invention, a method for forming a cam face on a structure member of a loading cam device for a toroidal-type continuously variable transmission, since the cutting tool is axially driven against the one axial surface, i.e., a surface being machined for the formation of the cam face, even if the driving force becomes large, the elastic deformation of the cutting tool does not take place to such an extent as to affect the machining accuracy. Accordingly, the cutting tool can be driven against the surface being machined at a sufficiently large force, with the result that, in addition to the necessary accuracy being kept, the machining efficiency is improved and the time required for the machining of the cam face is shortened.

In addition, the processing itself of the cam face relies upon the cutting machining, which make it unnecessary to perform the pre-machining for the removal of the surface layer and further to carry out the post-machining for the removal of the excessive thickness portions produced due to the swinging forging. Moreover, there is no need for a press apparatus with a particularly large capacity. Accordingly, the machining process is simplified, thus reducing the manufacturing time as well as reducing the cost required for the formation of the cam face.

DESCRIPTION OF THE PREFERRED EMBODIMENTS

Figure 5:
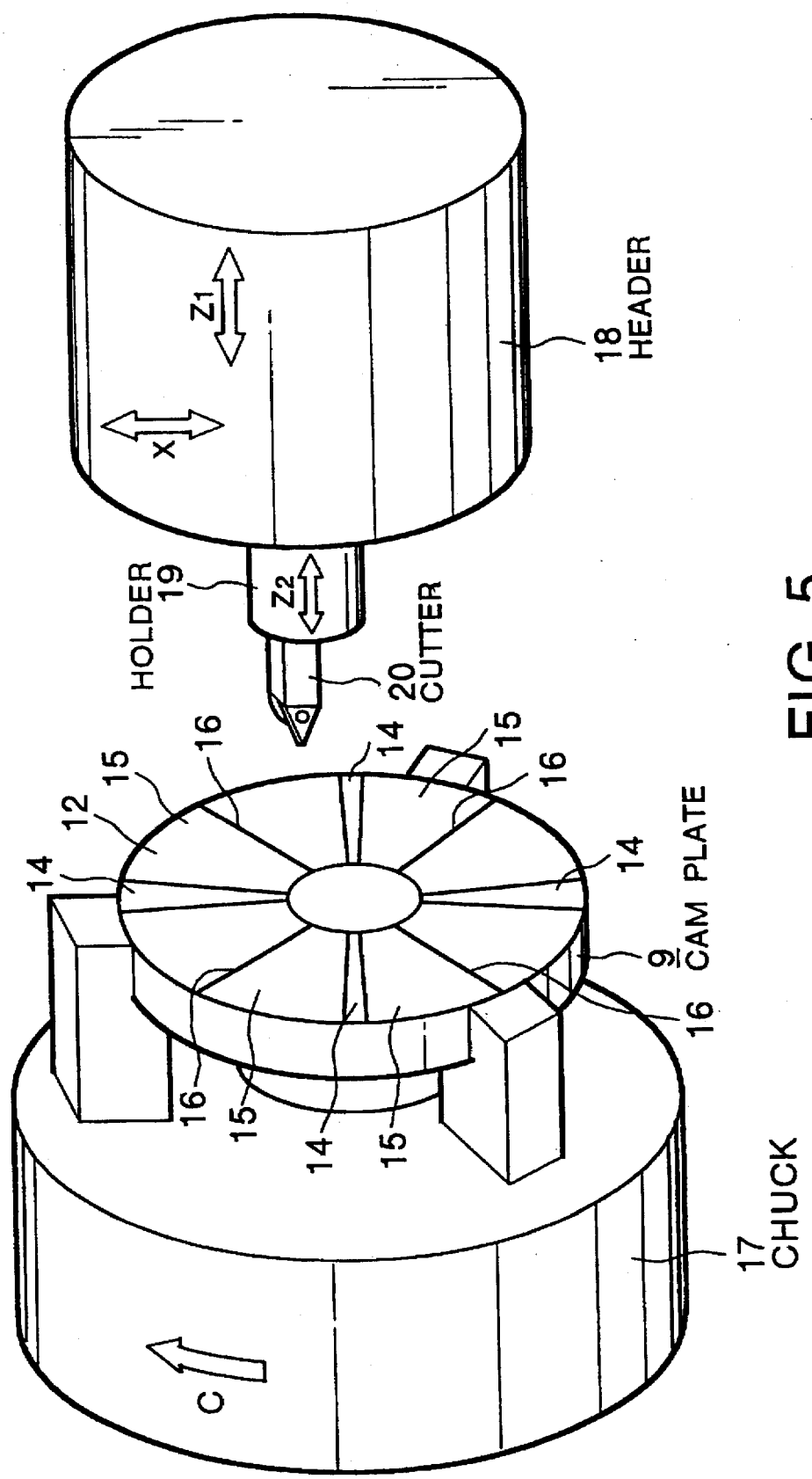
FIG. 5 is a diagrammatic illustration of a machining apparatus for performing a method according to the present invention.

FIG. 5 illustrates a machining apparatus applicable to a method of forming a cam face on a structure member of a loading cam device for a toroidal-type continuously variable transmission. A chuck 17 is coaxially fixed to an end portion of a main shaft (spindle) of the machining apparatus so as to be rotatable together with the main shaft in a direction indicated by an arrow C. To the chuck 17, a cam plate q being a workpiece is fixed to be coaxially with the chuck 17 and the main shaft in forming a cam face 12. The structure of the chuck 17 is similar to a chuck incorporated into an ordinary lathe.

A header 18 provided in opposed relation to the chuck 17 is displaceable in a direction Z1, i.e., in the axial directions of the chuck 17, and in a direction X, i.e., in the diametrical directions thereof. Further, a holder 19 is provided in an end surface of the header 18 to be in confronting relation to the chuck 17, and can be made to withdraw and emerge with respect to the end surface thereof. In other words, the holder 19 can move or displace in its axial direction Z2. Further, at the tip portion of the holder 19 there is fixedly supported a cutter 20 e.g. a cutting tool. The holder 19 is displaceable at a high speed and the displacement is controlled by means of a numerical control system.

When the cam face 12 is formed on one surface of the cam plate 9 (or the cam face 13 is formed on the back surface of the input-side disk 2) by means of the above-mentioned machining apparatus, the chuck 17 holding and fixing the cam plate 9 is rotated together with the main shaft, and in the meantime the tip portion of the cutter 20 is axially driven against the one surface of the cam plate 9. The holder, 19 supporting and fixing the cutter 20 is displaced axially. That is, in accordance with an signal from a numerical control apparatus (NC apparatus), the rotation of the main shaft is made to be synchronized with the axial displacement of the holder 19 and, in accordance with the rotation of the chuck 17, the circumferentially extending cross-sectional configuration of the one surface of the cam plate 9 is made to be coincident with the circumferentially extending cross-sectional configuration of the cam face 12 to be formed.

Moreover, simultaneously with axial displacement of the holder 19 in synchronism with the rotation of the chuck 17, or after and before the axial displacement of the holder 19, the header 18 is displaced in the direction shown in the arrow X, i.e., the diametrical directions of the chuck 17, in FIG. 5. Consequently, pluralities of flat portions 14, 14 and concaves 15, 15 are turned out on the cam plate 9, thus forming, thereon, the cam face 12 being an irregular surface circumferentially extending.

Figure 1:
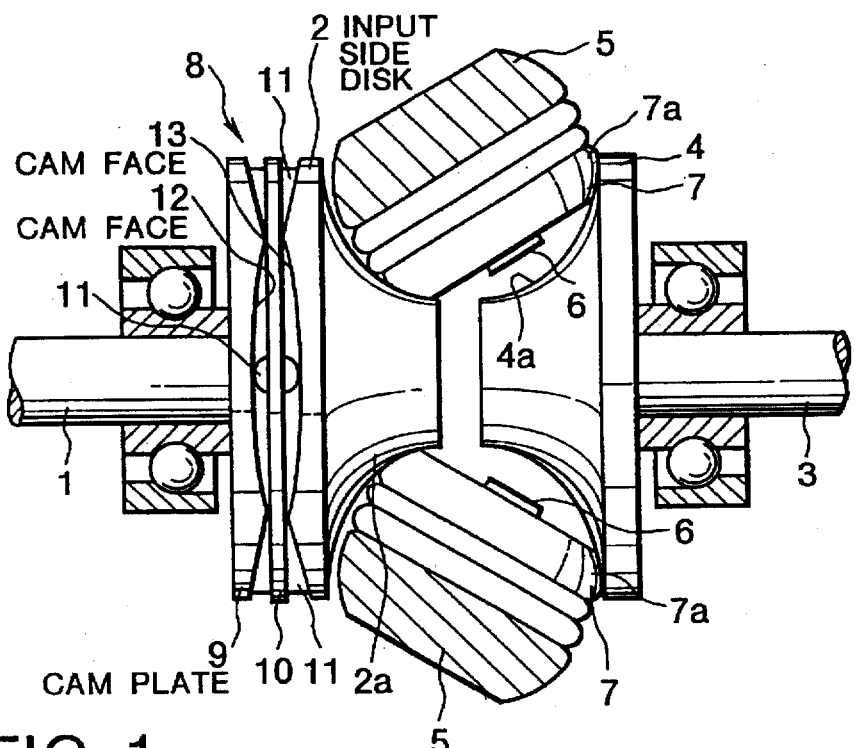
FIG. 1 is a side elevational view showing a basic structure of a toroidal-type continuously variable transmission in the maximum deceleration state.
Figure 2:
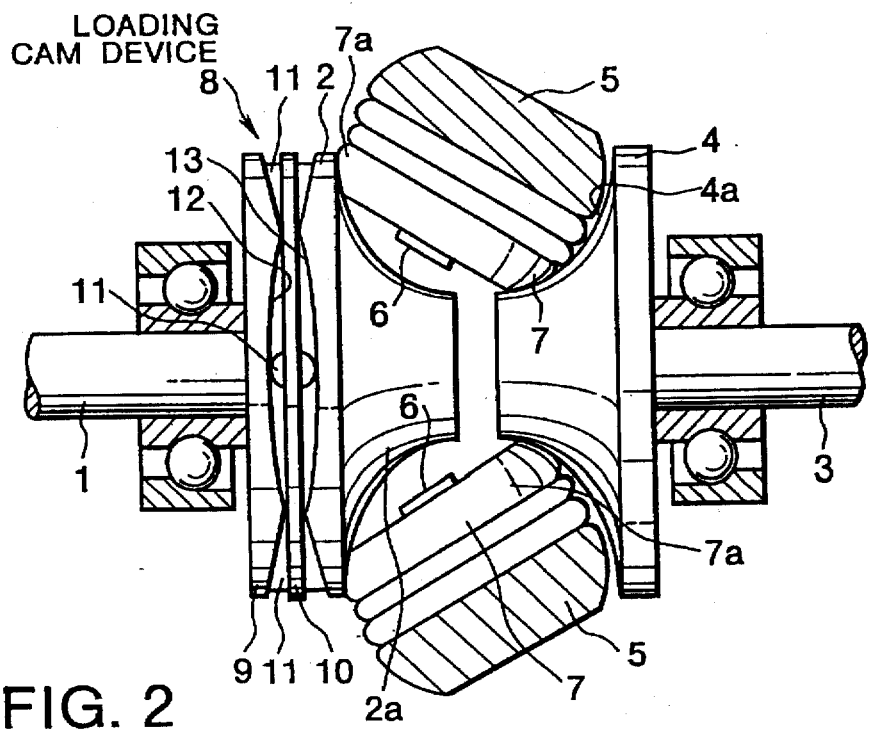
FIG. 2 is a side elevational view showing the same basic structure in the maximum acceleration state.
Figure 3:
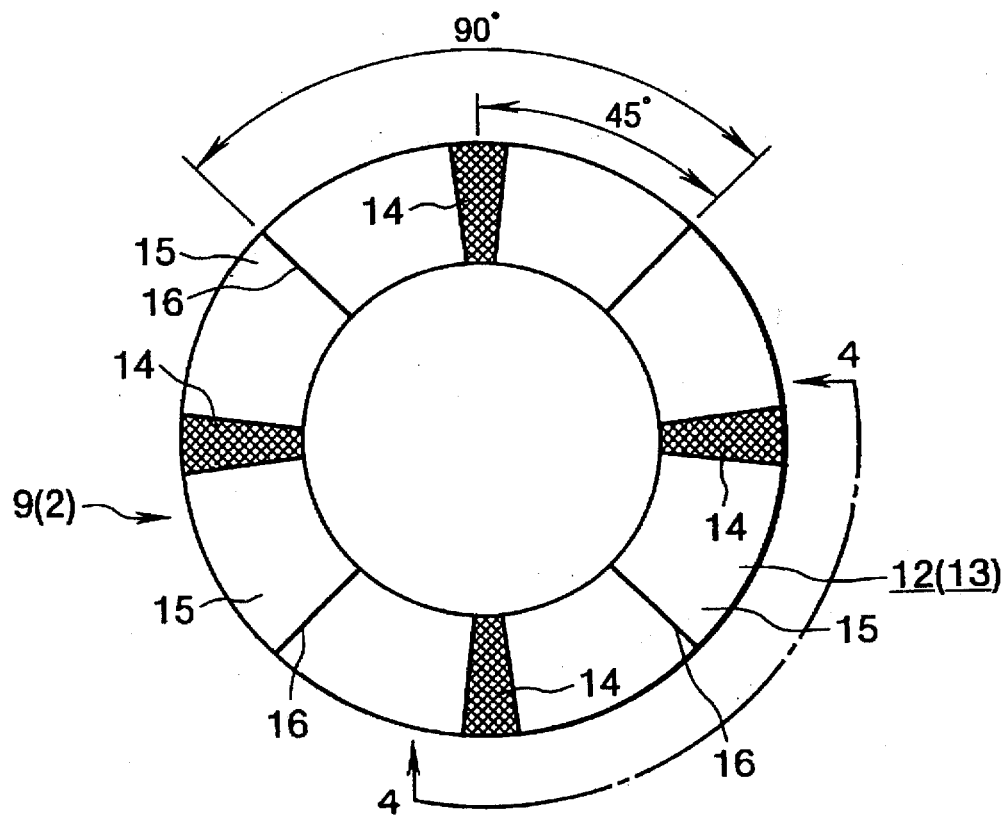
FIG. 3 is an elevational view of a cam face.
Figure 4:
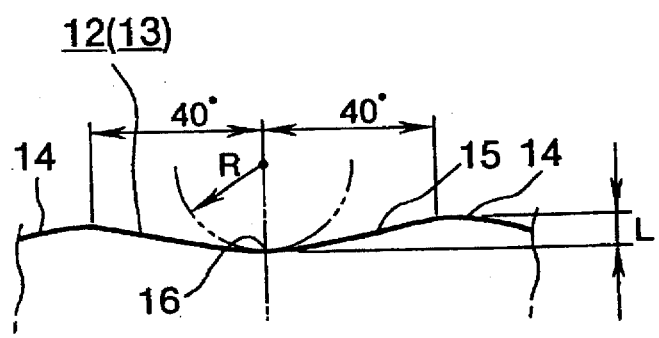
FIG. 4 is a detail view taken along line 4—4 in FIG. 3.

The stroke length S of the holder 19 is required to exceed the step L (see FIG. 4, 4 to 5 [mm] for an ordinary toroidal-type continuously variable transmission for ordinary motor vehicles) on the cam face to be formed, i.e., to be "S>L". Further, when the periodic follow-up is 300 to 400 times per minute (when the reciprocating movement is made 300 to 400 times per minute), the cam face machining can satisfactorily be put into practical use. In the case of the periodic follow-up being set to 300 to 400 times per minute, the rotational speed of the chuck 17 takes a value obtained by dividing the number of times of the follow-up by the number of the concave surfaces 15, 15 making up the cam face 12. For example, when the number of the concave surfaces 15, 15 is "3", the rotational speed of the chuck 17 is set to 100 to 133 [rpm]. When the number of the concave surfaces 15, 15 is "4" as illustrated in FIG. 5, the rotational speed of the chuck 17 results is set to 75 to 100 [rpm]. Furthermore, the stroke length of the header 18 in the direction X, i.e., in the diametric directions of the chuck 17, is set to be greater than the difference between the inner and outer diameters of the cam plate 9 on which the cam face 12 is formed. For example, in the case of the cam plate 9 making up a general toroidal-type continuously variable transmission for motor vehicles, the minimum inner diameter is about 90 [mm] and the maximum outer diameter is about 150 [mm], whereupon the stroke length in the direction X must be over 30 [mm].

According to a method of forming a cam face on a structure member of a loading cam device for a toroidal-type continuously variable transmission thus arranged, because the cutter 20 is placed or thrust into one surface of the cam plate 9, on which the cam face 12 is formed, in the axial direction, there is no elastic deformation of the cutter 20 occurring to affect the manufacturing accuracy if the force placed into the surface is made greater. Therefore, a cutting tool or something having a great flexural rigidity can be used as the cutter 20, besides a small protruding amount from the holder 19 also permits satisfactory machining. Moreover, since the cutter 20 is pressed axially so as to provide a great rigidity, the elastic deformation of the cutter 20 substantially remains within a disregardable range. Accordingly, the cutter 20 can be placed on the one surface of the cam plate 9 at a sufficiently strong force, besides it is possible to ensure a necessary accuracy, improve the manufacturing accuracy and shorten the time required for the machining of the cam face 12.

In addition, the machining itself of the cam face 12 is based on the cutting machining to remove unnecessary portions of the metallic material, which make it unnecessary to perform pre-machining for the removal of the surface layer and further to carry out post-machining for the removal of the excessive thickness portions produced due to the swinging forging. Moreover, there is no need for a press apparatus with a particularly large capacity. Accordingly, the machining process become simplified, thus reducing the manufacturing time as well as reducing the cost required for the formation of the cam face.

Further speaking, as well as the prior manufacturing way, the method according to the present invention permits a surface processing such as a barrel processing for the cam face 12 after the cutting machining without any limitation. Although heat treatment such as carburizing can be used for the cam plate 9 or the input-side disk 2 before the formation of the cam face 12 or 13, if taking the hardness of the cutter 20 into consideration (if using a cutter having a hardness to allow the cutting of a portion hardened by the heat treatment), the method of forming a cam face on a structure member of a loading cam device for a toroidal-type continuously variable transmission according to the present invention can also carry out the heat treatment without requiring further conditions.

In the case of the aforementioned conventional methods 1) and 2), it is difficult to form the cam face after the heat treatment. Therefore, the heat treatment has been carried out after the formation of the cam face 12 and the configuration accuracy and dimension accuracy have been accomplished by grinding afterwards. However, this raises the manufacturing cost because of requiring another manufacturing process, as well as makes it difficult to sufficiently ensure the configuration and dimension accuracies because of the abrasion of the whetstone. On the contrary, the method according to the present invention allows the pressing of the cutter 20 against the surface being processed, which permits the formation of the cam face 12 even after the heat treatment. For this reason, the manufacturing cost can be reduced as compared with that in the conventional method wherein the cam face is ground with a whetstone after heat treatment.

Also, the numerical control apparatus described above includes a copy shaping control apparatus.

A method of forming a cam face on a component of a loading cam device for a toroidal-type continuously variable transmission according to the present invention is arranged and works as described above, thus making it possible to ensuring the necessary accuracy as well as forming the cam face at a low cost.

What is claimed is:

1. A method of forming a cam face on a structure member to be machined of a loading cam device for a toroidal-type continuously variable transmission, comprising the steps of:

rotating said structure member about its own axis, said structure member being incorporated into said loading cam device to be rotatable about its own axis;

axially pressing a cutting tool mounted on a holder against one axial surface of said structure member to be formed to have said cam face;

axially displacing said cutting tool in a direction $Z_2$ and axially displacing a header supporting said holder in a direction $Z_1$ in accordance with a rotational angle of said structure member to form an irregular surface serving as said cam face; and forming a circumferentially extending surface;

wherein said cutting tool is displaced in a diametric direction of said structure member in accordance with the rotational angle of said structure member, and wherein the displacements of the axial direction and the diametric direction are controlled by a numerical control system or a copy shaping control system, and wherein a stroke length in the axial direction of said cutting tool is set to exceed a step between a flat portion and concave portion on the cam face to be formed.

2. A method of forming a cam face on a structure member of a loading cam device for a toroidal-type continuously variable transmission as claimed in claim 1, wherein a stroke length in the diametric direction of said cutting tool in the diametric direction of said loading cam device is set to be greater than a difference between an inner and outer diameters of the structure member of which the cam face is formed.

* * * * *